United States Patent
Zabulon et al.

(10) Patent No.: US 12,371,157 B2
(45) Date of Patent: Jul. 29, 2025

(54) METHOD FOR MONITORING AN AIRCRAFT LANDING GEAR EMPLOYING AT LEAST ONE ACCELEROMETER SUPPORTED BY A WHEEL OF THE LANDING GEAR, AND AIRCRAFT IMPLEMENTING THIS METHOD

(71) Applicants: SAFRAN ELECTRONICS & DEFENSE, Paris (FR); SAFRAN LANDING SYSTEMS, Velizy-Villacoublay (FR)

(72) Inventors: Joël Zabulon, Moissy-Cramayel (FR); Kyril Lekarski, Moissy-Cramayel (FR); Nicolas Fanton, Moissy-Cramayel (FR); Benjamin Michaud, Moissy-Cramayel (FR); Etienne Brunstein, Moissy-Cramayel (FR)

(73) Assignees: SAFRAN ELECTRONICS & DEFENSE, Paris (FR); SAFRAN LANDING SYSTEMS, Velizy-Villacoublay (FR)

( * ) Notice: Subject to any disclaimer, the term of this patent is extended or adjusted under 35 U.S.C. 154(b) by 80 days.

(21) Appl. No.: 18/561,048

(22) PCT Filed: May 18, 2022

(86) PCT No.: PCT/EP2022/063488
§ 371 (c)(1),
(2) Date: Nov. 15, 2023

(87) PCT Pub. No.: WO2022/243392
PCT Pub. Date: Nov. 24, 2022

(65) Prior Publication Data
US 2024/0253774 A1  Aug. 1, 2024

(30) Foreign Application Priority Data
May 19, 2021 (FR) .................................. 2105233

(51) Int. Cl.
*B64C 25/28* (2006.01)
*B64D 45/00* (2006.01)

(52) U.S. Cl.
CPC ........ B64C 25/28 (2013.01); *B64D 2045/008* (2013.01); *B64D 2045/0085* (2013.01)

(58) Field of Classification Search
CPC .................. B64C 25/28; B64C 25/001; B64D 2045/008; B64D 2045/0085; B60C 23/0488; G01B 21/26
(Continued)

(56) References Cited

U.S. PATENT DOCUMENTS 8,543,322 B1    9/2013  Nance et al.
10,464,690 B2 *  11/2019  Vinson ...................... B64F 5/60

FOREIGN PATENT DOCUMENTS

CA    2610835 A1 *  12/2006  ............. B64D 45/00
CN    117033949 A *  11/2023
(Continued)

OTHER PUBLICATIONS

International Search Report (with English translation) mailed Sep. 16, 2022, issued in corresponding International Application No. PCT/EP2022/063488, filed May 18, 2022, 5 pages total.
(Continued)

*Primary Examiner* — Eric Blount
(74) *Attorney, Agent, or Firm* — CHRISTENSEN O'CONNOR JOHNSON KINDNESS PLLC

(57) ABSTRACT

A method for monitoring an aircraft landing gear. The method includes using information from at least one accelerometer firmly secured to a landing gear wheel mounted to
(Continued)

rotate on a landing gear axle to estimate an angle of deflection α of the axle at least when the wheel is in contact with the ground.

10 Claims, 3 Drawing Sheets

(58) Field of Classification Search
USPC .......................................................... 340/960
See application file for complete search history.

(56) References Cited

FOREIGN PATENT DOCUMENTS

| EP | 3118030 A1 | 1/2017 | |
|---|---|---|---|
| EP | 3336485 A1 | 6/2018 | |
| EP | 3336485 B1 * | 9/2020 | ............. B64C 25/10 |
| WO | 2012140370 A1 | 10/2012 | |

OTHER PUBLICATIONS

Written Opinion (with English translation) mailed Sep. 16, 2022, issued in corresponding International Application No. PCT/EP2022/063488, filed May 18, 2022, 8 pages total.

* cited by examiner

US 12,371,157 B2

METHOD FOR MONITORING AN AIRCRAFT LANDING GEAR EMPLOYING AT LEAST ONE ACCELEROMETER SUPPORTED BY A WHEEL OF THE LANDING GEAR, AND AIRCRAFT IMPLEMENTING THIS METHOD

CROSS-REFERENCE TO RELATED APPLICATIONS

This application is a National Stage of International Application No. PCT/EP2022/063488, filed May 18, 2022, which claims priority to French Patent Application No. 2105233, filed May 19, 2021, the entire disclosures of which are hereby incorporated by reference in their entirety for all purposes.

The invention relates to the field of aviation, and more particularly to the monitoring of an aircraft landing gear.

BACKGROUND OF THE INVENTION

Aircraft landing gear are constantly monitored. Landing gear are rarely equipped with a hard landing detector, enabling a particularly hard landing to be signalled, which could potentially lead to the deformation of certain parts of the landing gear, in particular, the axles carrying the landing gear wheels. This detector constitutes additional on-board equipment, a source of extra weight and maintenance.

In addition, there is an unmet need to monitor the deflections of the landing gear axles in real time, to check whether these comply with the values expected during use or whether, on the contrary, they reach values that suggest plastic deformation of a portion of the landing gear. In practice, these plastic deflections are detectable only during a heavy maintenance operation when the landing gear is removed from the aircraft and returned to the maintenance workshop.

AIM OF THE INVENTION

The aim of the invention is to provide a means of real-time monitoring of an aircraft landing gear that does not require the landing gear to be fitted with ad hoc devices or the landing gear to be removed.

SUMMARY OF THE INVENTION

In order to achieve this aim, a method for monitoring an aircraft landing gear is proposed, comprising the step of using information from at least one accelerometer firmly secured to a landing gear wheel mounted to rotate on a landing gear axle to estimate an angle of deflection of the axle at least when the wheel is in contact with the ground.

In this way, the presence of an accelerometer on the wheels of the landing gear is utilised to evaluate the signal to generate information that is not directly linked to the wheel, but are useful for monitoring the landing gear itself and its deformations during use.

In particular, landing gear wheels are equipped with Tyre Pressure Monitoring Systems (TPMS). The latest devices of this type to be developed are self-sufficient in terms of energy, transmit their information remotely, and are equipped with at least one three-axis accelerometer. Some are even equipped with two accelerometers, one to identify the phase of flight (in particular, by detecting the acceleration caused by the impact of the wheels on the ground upon landing), and the other to identify the angular position of the device when the aircraft is stationary.

Thus, and according to an advantageous embodiment of the invention, used are the signals from the accelerometer(s) integrated into a device for monitoring the pressure of the tyre secured to the wheel. In this way, the presence of accelerometers in the tyre pressure monitoring device may be utilised to use the signals. The signals from these accelerometers are available at all times, and may therefore be utilised to generate the information required regarding the landing gear.

The invention also relates to an aircraft equipped to implement this method.

DESCRIPTION OF THE FIGURES

The invention can be better understood in the light of the following description of a particular embodiment of the invention, given with reference to the figures of the accompanying drawings, in which.

DETAILED DESCRIPTION OF THE INVENTION

Figure 1:
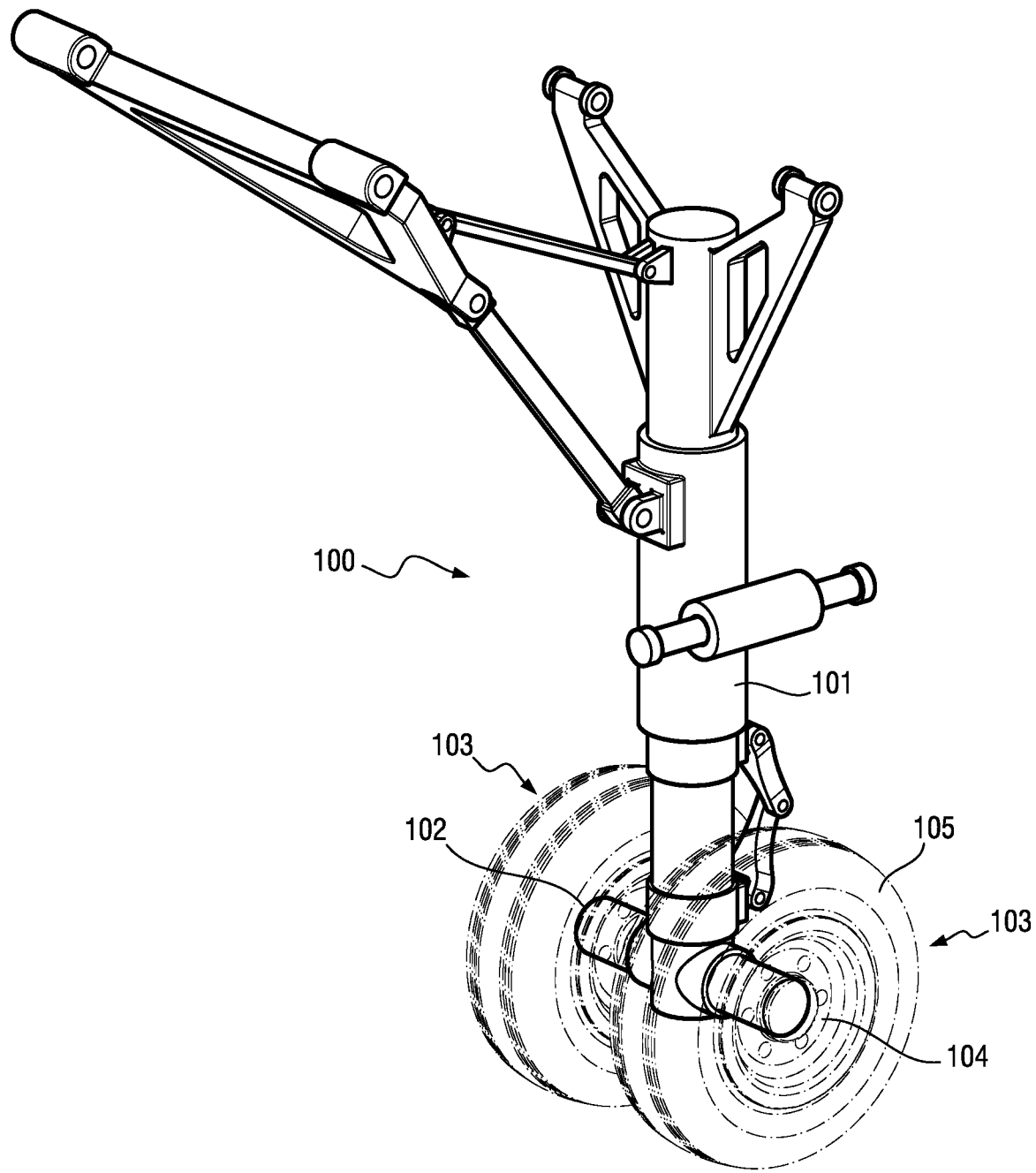
FIG. 1 is a schematic view of an aircraft landing gear, the wheels being illustrated in dotted lines to show the axle that carries them.
Figure 2:
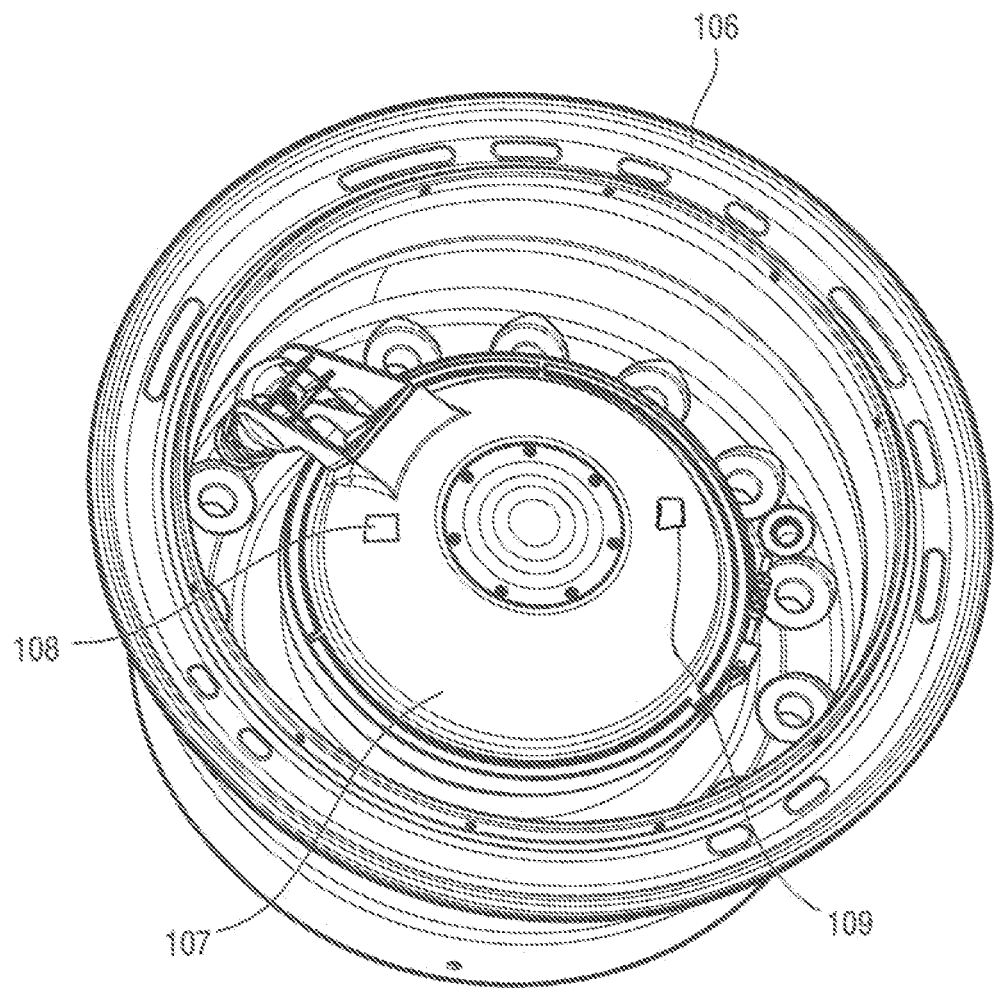
FIG. 2 is a perspective view of a half-rim of one of the wheels on the landing gear in FIG. 1, equipped with a tyre pressure monitoring device.

The invention relates to the monitoring of an aircraft landing gear 100, as shown in FIG. 1. The landing gear 100 comprises a strut 101 secured to the structure of the aircraft, carrying an axle 102 on which wheels 103 are mounted to rotate. Each wheel 103 comprises a rim 104 carrying a tyre 105. In a manner known per se, each rim comprises two half-rims bolted together. FIG. 2 shows an outer half-rim 106 equipped with a tyre pressure monitoring device 107. This device incorporates at least one accelerometer 108, in this case, a triaxial accelerometer, whose signals are used in accordance with the invention. The following direct reference points are used to represent the evaluation of the accelerometer signals:

|  | Reference point G related to the ground | Reference point A related to the axle | Reference point M related to the wheel | Reference point C related to the accelerometer |
|---|---|---|---|---|
| First axis | $X_g$ | $X_a$ | $X_m$ | $X_c$ |
| Second axis | $Y_g$ | $Y_a$ | $Y_m$ | $Y_c$ |
| Third axis | $Z_g$ | $Z_a$ | $Z_m$ | $Z_c$ |

Figure 3:
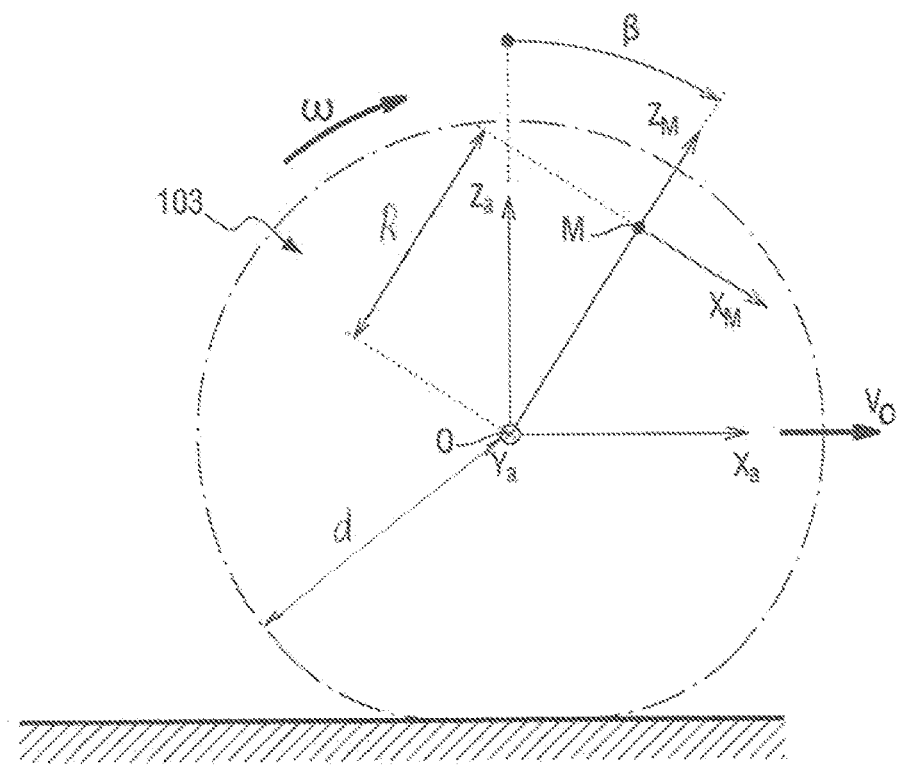
FIG. 3 is a diagram showing the various reference points that are used to use the accelerometer signals, the wheel being seen here from the side.
Figure 4:
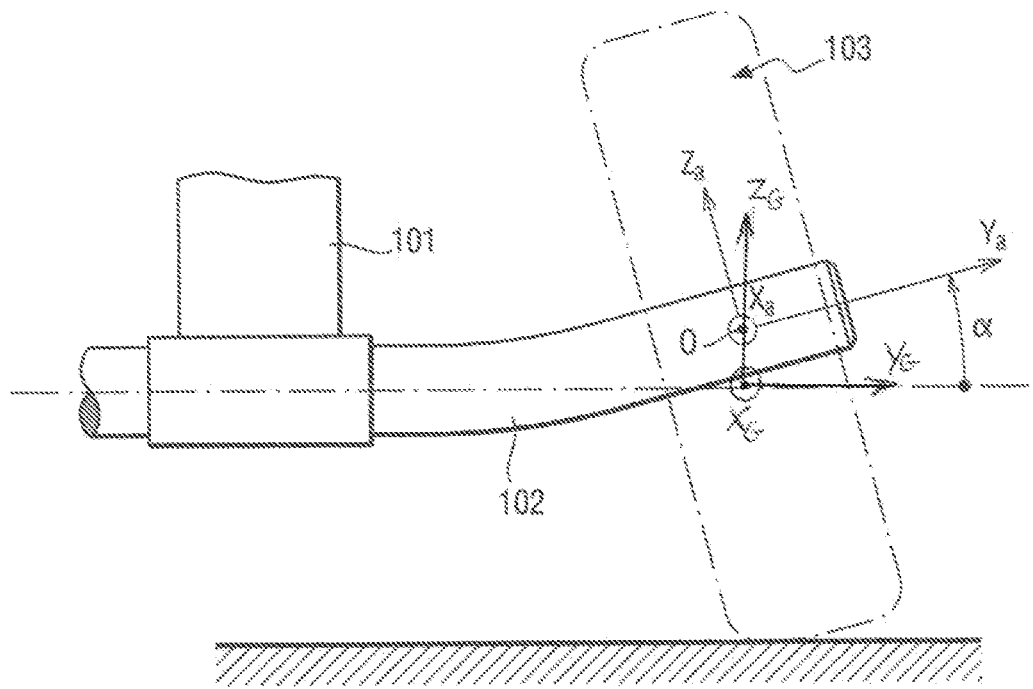
FIG. 4 is a partial schematic view of the landing gear in FIG. 1 seen from the front, showing in an exaggerated manner the deflection of the axle that is to be estimated by the method of the invention.

The references, illustrated in FIGS. 3 and 4, are constructed as follows:

Reference point G: direct orthonormal reference point related to the wheel considered, which is not inclined and mounted on a perfect, non-flexed axle, having as its origin the point O, in which the axis $Z_g$ is vertical, the axis $X_g$ is horizontal and follows the direction of forward travel, and the axis $Y_g$ is horizontal and completes the direct orthonormal trihedron;

Reference point A: direct orthonormal reference point related to the axle, and whose origin is on the geometric axis of the latter at a point O, substantially at the centre of the wheel 103. As can be seen more particularly in FIG. 4, reference point G is converted in-to reference point A by a rotation of angle α about the axis $X_g$, which is the angle of deflection of the axle to be estimated. The $Y_a$ axis extends along the axis of rotation of the wheel. The origin of this reference point moves along the $X_g$ axis at a speed $V_0$. The transition matrix from reference point G to reference point A is the matrix:

$$Rot_{G \to A} = \begin{bmatrix} 1 & 0 & 0 \\ 0 & \cos\alpha & \sin\alpha \\ 0 & -\sin\alpha & \cos\alpha \end{bmatrix}$$

Reference point M: direct orthonormal reference point related to the wheel, and whose origin is a point M located at a distance R from the axis $Y_a$. Reference point M corresponds substantially to the centre of the accelerometer 108 carried by the pressure monitoring device 107. Reference point M is deduced from reference point A by rotation about the axis $Y_a$ through an angle β, which is the angle of rotation of the wheel as the aircraft moves. The speed of rotation of the wheel is therefore ω=β̇. The $Y_m$ axis moves in the same direction as the $Y_a$ axis. The $Z_m$ axis extends in a radial direction, while the $X_m$ axis extends in an orthoradial direction. The transition matrix from reference point A to reference point M is the matrix:

$$Rot_{A \to M} = \begin{bmatrix} \cos\beta & 0 & -\sin\beta \\ 0 & 1 & 0 \\ \sin\beta & 0 & \cos\beta \end{bmatrix}$$

Reference point C: direct reference point (not necessarily orthonormal) related to the accelerometer 108 carried by the pressure monitoring device 107. The three axes of reference point C correspond to the three input axes of the three elementary accelerometers forming the accelerometer 108. It should be noted that, in theory, the C and M reference points coincide. In practice, they are slightly offset from each other, due to the assembly faults. Moving from reference point M to reference point C by 6 small rotations defining the alignment errors (or misalignments) $\theta_{xy}$, $\theta_{xz}$, $\theta_{yx}$, $\theta_{yz}$, $\theta_{zx}$, $\theta_{zy}$ of the accelerometers, which define the transition matrix used to obtain the accelerations felt by accelerometer 108 in reference point C from the measurements taken in reference point M:

$$Proj_{M \to C} = \begin{bmatrix} 1 & \theta_{xy} & \theta_{xz} \\ \theta_{yx} & 1 & \theta_{yz} \\ \theta_{zx} & \theta_{zy} & 1 \end{bmatrix}$$

With all calculations done, and retaining only the first-order terms, the accelerations $\gamma_{x,c}$ (substantially orthoradial), $\gamma_{y,c}$ (along a direction substantially parallel to a central axis of the axle), and $\gamma_{z,c}$ (substantially radial) measured by the elementary accelerometers of the triaxial accelerometer 108 along the three axes of reference point C are worth:

$$\begin{bmatrix} \gamma_{x,c} \\ \gamma_{y,c} \\ \gamma_{z,c} \end{bmatrix} \approx \begin{bmatrix} -g \cdot \sin\beta + g \cdot \theta_{xz} \cdot \cos\beta + (\tau + \cos\beta) \cdot \dot{V}_0 - \theta_{xz} \cdot R\omega^2 + b_x \\ g \cdot \sin\alpha - g \cdot [\theta_{yx} \cdot \sin\beta - \theta_{yz} \cdot \cos\beta] - \theta_{yz} \cdot R\omega^2 + b_y \\ g \cdot \cos\beta - g \cdot \theta_{zx} \cdot \sin\beta + \sin\beta \cdot \dot{V}_0 - R\omega^2 + b_z \end{bmatrix}$$

In this expression, g is the acceleration of the Earth's gravity, τ is the ratio between the distance R and the rolling radius d of the wheel, and the quantities $b_x$, $b_y$, $b_z$ are offsets (commonly called biases) affecting the acceleration measurements on each of the axes of the accelerometer 108. It appears that the transverse acceleration $\gamma_{y,c}$ comprises various terms, including:

1—a term in g·sin α, that is substantially constant during a rolling phase on the ground, and that therefore depends directly on the angle of deflection α of the axle 102;
2—the offset term $b_y$, which is substantially constant;
3—periodic variable terms with the rotation of the wheel at sin β, cos β;
4—finally, a term varying with the speed of rotation of the wheel $\omega^2$.

By utilising the transverse acceleration $\gamma_{y,c}$, in accordance with the invention, it is therefore possible to estimate the angle of deflection α of the axle 102.

According to a first particular type of implementation of the method of the invention, the angle β of rotation of the wheel 103 is estimated from the orthoradial acceleration $\gamma_{x,c}$ and/or the radial acceleration $\gamma_{z,c}$, and from this estimate, the speed of rotation ω=β̇ is estimated. These two estimates make it possible to estimate the variable terms 3/ and 4/ to eliminate them from the transverse acceleration $\gamma_{y,c}$, so as to retain only the quantity in $b_y$+g·sin α, that will be processed to extract the deflection angle α.

A second particular type of implementation of the invention comprises filtering the periodic variable terms with the angle β of rotation of the wheel 103 by using a low-pass filter whose cut-off frequency is lower than the frequency of rotation of the wheel (equal to ω/2π). The filtered accelerations are thus obtained:

$$\begin{bmatrix} \gamma_{x,c,f} \\ \gamma_{y,c,f} \\ \gamma_{z,c,f} \end{bmatrix} \approx \begin{bmatrix} \tau \cdot \dot{V}_0 - \theta_{xz} \cdot R\omega^2 + b_x \\ g \cdot \sin\alpha - \theta_{yz} \cdot R\omega^2 + b_y \\ -R\omega^2 + b_z \end{bmatrix}$$

At sufficiently high speeds, the offset term $b_z$ is negligible, such that the filtered acceleration $\gamma_{z,c,f}$ is a good estimator of the term $-R\omega^2$. By replacing the expression for $\gamma_{y,c,f}$, the following term are obtained:

$$\gamma_{y,c,f} - \theta_{yz} \gamma_{z,c,f} \approx g.\sin\alpha + b_y$$

Therefore, it is again possible to estimate the same quantity $b_y$+g·sin α, and thus monitor the angle of deflection α of the axle. This last relation may be modelled as:

$$y = h.X + v$$

Where v is a measurement noise, with:

$$y = \gamma_{y,c,f} \quad h = [1 \ \gamma_{z,c,f}] \quad X = \begin{bmatrix} g \cdot \sin\alpha + b_y \\ \theta_{yz} \end{bmatrix}$$

The two components of the state vector X may then be estimated by accumulating the y and h measurements over the period during which the filtering is effective, precisely after the initial transient when wheel 103 impacts the ground and before the wheel speed is too slow (i.e., when the wheel frequency is lower than the filter cut-off frequency), and then estimating the state vector X by any appropriate method, such as a pseudo-inverse method.

A first algorithm for implementing this second particular type of implementation of the method of the invention is now described. It comprises the following five steps:

A—Acceleration measurements $\gamma_{y,c}$ and $\gamma_{z,c}$ are started at a fixed frequency (100 Hz, for example) and then filtered by means of a low-pass filter with a cut-off frequency of a few Hz. Sampling starts at the beginning of the landing, detectable when $|\gamma_{z,c}|$ exceeds a certain threshold or is in saturation. Filtering may start on saturated values, allowing the transitional period to pass more quickly and filtering to be established more quickly;

B—Once the saturation phase has been passed, the following data is collected, either, at the same frequency or at a lower frequency:

$$y_i = \gamma_{y,c,f}(t_i) \quad h(t_i) = [1 \ \gamma_{z,c,f}(t_i)].$$

where the $t_i$ are the sampling instants;

C—Sampling is stopped when the wheel speed is below a given threshold, that may be detected with a threshold on $|\gamma_{z,c,f}|$.

D—Putting the sampled data into the following matrix form:

$$Y = \begin{bmatrix} y_1 \\ \ldots \\ y_n \end{bmatrix} \quad H = \begin{bmatrix} h_1 \\ \ldots \\ h_n \end{bmatrix}$$

the estimated state vector X is obtained by calculating $\hat{X} = M \cdot Y$ with the pseudo-inverse $M = (H^t \cdot H)^{-1} \cdot H^t$ E—Finally, the estimated deflection angle $\alpha$ is obtained by $\hat{\alpha} = \arcsin(\hat{X}(1)/g)$ (disregarding the offset $b_y$), and the estimated misalignment $\theta_{yz}$ is obtained by $\hat{\theta}_{yz} = \hat{X}(2)$.

This first algorithm may be activated as soon as the wheels of the landing gear touch the ground. It is possible to detect this instant $t_0$ by monitoring the tyre pressure and detecting a sudden increase in the pressure of the tyre fitted to the rim in question, thereby triggering the acquisition of measurements. The start of treatment may be delayed if the measurements are saturated. In particular, the acceleration $\gamma_{z,c}$ integrates the centripetal acceleration, which can reach a few tens of g at the start of rotation. In this case, nevertheless, low-pass filtering may be activated, enabling the steady state to be reached more quickly (elimination of the transient). After a predefined time, the measurements are taken to calculate the quantities Y and H. Sampling is ended either following a predefined time or when the acceleration $\gamma_{z,c,f}$ falls below a predetermined threshold. Below this threshold, low-pass filtering is no longer effective in eliminating sinusoidal variable terms. $\hat{\alpha}$ can then be calculated.

The calculations may be performed in real-time in one of the aircraft's computers (for example, on-board calculation means on the wheel or landing gear), or remotely by transmitting the data to a data collection device, on each flight or when the aircraft is checked at a maintenance centre.

The calculation of the pseudo-inverse may be replaced by a recursive least squares method. This may be used to smooth out the calculation load over the course of the acquisitions. When a large number of points are used, for example, for the least-squares estimation of the state vector, the low-pass filtering step A/ previously performed can be omitted, with the least-squares estimation then fulfilling the filtering role.

A second simplified algorithm is now proposed. Indeed, the previous algorithm is sensitive to the misalignment $\theta_{yz}$. If the misalignment $\theta_{yz}$ is known at least approximately before the flight (obtained with the first algorithm, for example, and assuming that it remains sufficiently constant over time, which is generally the case), and adopting the hypothesis that, at sufficiently low speed, the term $-\theta_{yz} \cdot R\omega^2$ is small compared with $g \cdot \sin\alpha$, the filtered transverse acceleration $\gamma_{y,c,f}$ is corrected as follows:

$$\gamma_{y,c,cor} \approx \gamma_{y,c,f} - \theta_{yz}\gamma_{z,c,f}$$

The estimated angle of deflection $\alpha$ is then obtained directly by:

$$\hat{\alpha} = \arcsin(\gamma_{y,c,cor}/g).$$

An alternative implementation of the method of the invention applies to a wheel whose pressure monitoring device 107 comprises a second accelerometer 109, also triaxial, arranged diametrically opposite relative to the first accelerometer 108. Calling $\gamma_{x,c,1}$, $\gamma_{y,c,1}$, $\gamma_{z,c,1}$ the accelerations measured by the first accelerometer 108, and $\gamma_{x,c,2}$, $\gamma_{y,c,2}$, $\gamma_{z,c,2}$ the accelerations measured by the second accelerometer 109, the radial accelerations $\gamma_{z,c,1}$ and $\gamma_{z,c,2}$ are respectively worth:

$$\begin{cases} \gamma_{z,c,1} = g \cdot \cos\beta - g \cdot \theta_{zx,1} \cdot \sin\beta + \sin\beta \cdot \dot{V}0 - R\omega^2 + b_{z,1} \\ \gamma_{z,c,2} = -g \cdot \cos\beta + g \cdot \theta_{zx,2} \cdot \sin\beta - \sin\beta \cdot \dot{V}0 - R\omega^2 + b_{z,2} \end{cases}$$

Such that the average of these two accelerations is:

$$\bar{\gamma}_{z,c} = \frac{\gamma_{z,c,1} + \gamma_{z,c,2}}{2} = g\left(\frac{\theta_{zx,2} - \theta_{zx,1}}{2}\right) \cdot \sin\beta - R\omega^2 + \frac{b_{z,1} + b_{z,2}}{2}$$

Within this mean, the variable term in $g \cdot \cos\beta$ has disappeared. There is a sinusoidal variable term, but of low amplitude, that is much easier to filter. This averaged acceleration is then used to implement the method of the invention.

Thanks to the method of the invention, it is therefore possible to estimate the angle of deflection of the axle by using only the signals from one or more accelerometers carried by the associated wheel. This estimate may be used to monitor the deformations of the axle in various ways, such as:

monitoring any deflection(s) of the axle while the aircraft is in operation, checking on each landing that the deflection of the axle remains within the values compatible with normal elastic deformations;

recording any deflection(s) thus estimated to establish a trend curve and detect any drift in this deflection over time;

detecting a significant deflection following a landing, potentially indicating plastic deformation of the axle, this detection being the result of one of the accelerations measured by the accelerometer (s) exceeding a predetermined threshold.

The invention is not limited to the above description, but on the contrary covers any variant coming within the scope defined by the claims.

In particular, although the signals from the triaxial accelerometers incorporated in the tyre pressure monitoring device are used in this case, an accelerometer which is not necessarily triaxial may be used more generally, since the angle of deflection may even be estimated by using the single filtered transverse acceleration $$\gamma_{y,c,f} \approx g \cdot \sin\alpha - \theta_{yz} \cdot R\omega^2 + b_y$$

if the speed of rotation of the wheel may also be estimated (for example, by using the speed information provided by a tachometer) to eliminate the term in $R\omega^2$.

The reference point G may be at the landing strip.

The invention may be applied to an aircraft carrying an electronic control unit (comprising, for example, a processor and a memory) that is connected to the accelerometers and that executes a computer program comprising instructions arranged to implement the method. The electronic control unit is, for example, a type of Aircraft Condition Monitoring System (ACMS). Alternatively, the electronic control unit is housed in the bay of the landing gear and may be checked via a radio or wire link by means of a maintenance terminal.

The invention claimed is:

1. A method of monitoring an aircraft landing gear having a device for monitoring the pressure of a tire, the tire being carried by a wheel of the landing gear, the wheel being mounted to rotate on a landing gear axle, the method comprising:
estimating an angle of deflection $\alpha$ of the axle at least when the wheel is in contact with the ground, wherein the estimation uses information from at least one accelerometer integrated into the pressure monitoring device.

2. The method according to claim 1, wherein a transverse acceleration $\gamma_{y,c}$ measured by the accelerometer in a direction substantially parallel to a central axis of the axle and dependent on the angle of deflection $\alpha$ of the axle is used to estimate the angle of deflection $\alpha$ of the axle.

3. The method according to claim 2, wherein an angle $\beta$ of rotation of the wheel is estimated from an orthoradial acceleration $\gamma_{x,c}$ and/or a radial acceleration $\gamma_{z,c}$ measured by the accelerometer, and a speed of rotation $\omega = \beta^{\cdot}$ is then estimated, wherein the two estimates are utilized to eliminate from the transverse acceleration $\gamma_{y,c}$ terms varying with the angle of rotation and the speed of rotation, and then the angle of deflection $\alpha$ of the axle is estimated from the transverse acceleration $\gamma_{y,c}$ thus reprocessed.

4. The method according to claim 2, further comprising filtering the transverse acceleration $\gamma_{y,c}$ and a radial acceleration $\gamma_{z,c}$ measured by the accelerometer to obtain a filtered transverse acceleration $\gamma_{y,c,f}$ and a filtered radial acceleration $\gamma_{z,c,f}$ by eliminating the terms varying periodically as a function of an angle of rotation $\beta$ of the wheel.

5. The method according to claim 4, wherein the filtering is started from a landing onset that is detected when the quantity $|\gamma_{z,c}|$ exceeds a threshold or is in saturation.

6. The method according to claim 4, wherein, after the filtering has been established, the method further comprises:
collecting the data $$y_i = \gamma_{y,c,f}(t_i) h(t_i) = [1 \quad \gamma_{z,c,f}(t_i)].$$

where the $t_i$ are the sampling instants, $\gamma_{y,c,f}$ is the filtered transverse acceleration, and $\gamma_{z,c,f}$ is the filtered radial acceleration;

arranging the sampled data into the following matrix form:

$$Y = \begin{bmatrix} y_1 \\ \dots \\ y_n \end{bmatrix} \quad H = \begin{bmatrix} h_1 \\ \dots \\ h_n \end{bmatrix}$$

estimating a state vector X by calculating $\hat{X} = M \cdot Y$ with the pseudo-inverse $M = (H^t \cdot H)^{-1} \cdot H^t$; and estimating the angle of deflection of the axle by calculating $\hat{\alpha} = \arcsin(\hat{X}(1)/g)$ where g is the acceleration of gravity.

7. The method according to claim 6, wherein the pseudo-inverse calculation is replaced by a recursive least-squares method.

8. The method according to claim 4, further comprising calculating a corrected acceleration ($\gamma_{y,c,cor}$) from the filtered accelerations $\gamma_{y,c,f}$ and $\gamma_{z,c,f}$:

$$\gamma_{y,c,cor} \approx \gamma_{y,c,f} - \theta_{yz}\gamma_{z,c,f}$$

where $\theta_{yz}$ is given or estimated beforehand, and the angle of deflection of the axle is estimated by the calculation:

$$\hat{\alpha} = \arcsin(\gamma_{y,c,cor}/g),$$

where g is the acceleration of gravity.

9. The method according to claim 4, wherein two accelerometers are used that are arranged on the wheel diametrically opposite each other and measuring respective radial accelerations $\gamma_{z,c,1}$ and $\gamma_{z,c,2}$, and wherein the mean radial acceleration $$\bar{\gamma}_{z,c} = \frac{\gamma_{z,c,1} + \gamma_{z,c,2}}{2}$$

is formed and used as the radial acceleration for estimating the deflection angle of the axle.

10. An aircraft comprising at least one landing gear having a wheel to which is attached at least one accelerometer connected to an electronic control unit performing a computer program comprising instructions arranged to implement the method according to claim 1.

\* \* \* \* \*

UNITED STATES PATENT AND TRADEMARK OFFICE
CERTIFICATE OF CORRECTION

PATENT NO. : 12,371,157 B2  
APPLICATION NO. : 18/561048  
DATED : July 29, 2025  
INVENTOR(S) : Joël Zabulon et al.

Page 1 of 1

It is certified that error appears in the above-identified patent and that said Letters Patent is hereby corrected as shown below:

On the Title Page

| Column | Line | |
|--------|------|--|
| 1 | 4 | item (71), under "Applicants", delete "Velizy-Villacoublay (FR)" and insert -- Vélizy-Villacoublay (FR) -- |
| 1 | 4 | item (73), under "Assignees", delete "Velizy-Villacoublay (FR)" and insert -- Vélizy-Villacoublay (FR) -- |

In the Claims

| Column | Line | |
|--------|------|--|
| 8 | 15 | Claim 6, delete "$y_i = y_{y,c,f}(t_i)\ h(t_i) = [1\ \gamma_{y,c,f}(t_i)]$." and insert -- $y_i = \gamma_{y,c,f}(t_i)\ h(t_i) = [1\ \gamma_{zcf}(t_i)]$, -- |

Signed and Sealed this  
Eleventh Day of November, 2025

John A. Squires  
*Director of the United States Patent and Trademark Office*